Sept. 8, 1936.  L. C. HUCK  2,053,716
RIVET SETTING MACHINE
Original Filed Aug. 31, 1931  2 Sheets-Sheet 2
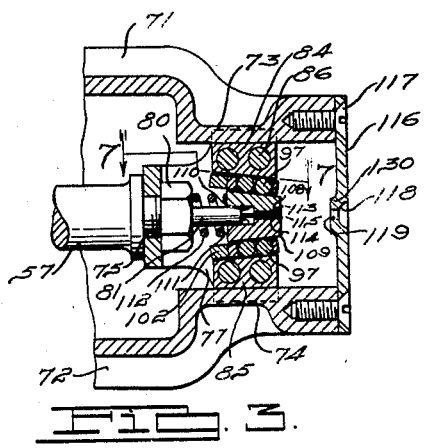
FIG. 3.
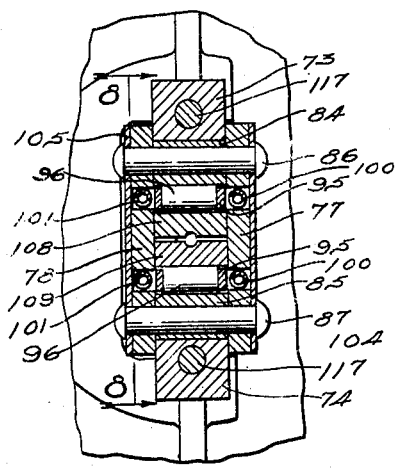
FIG. 4.
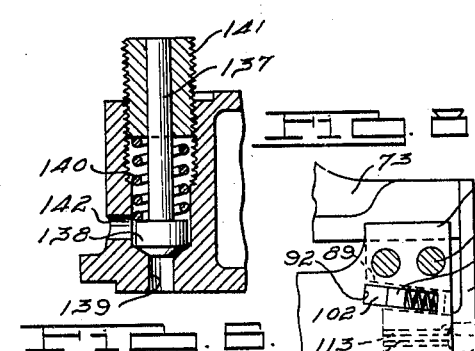
FIG. 5.
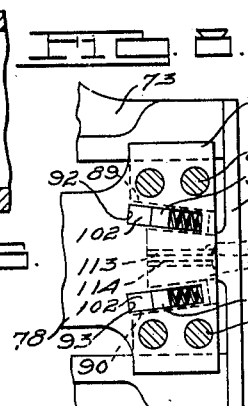
FIG. 6.
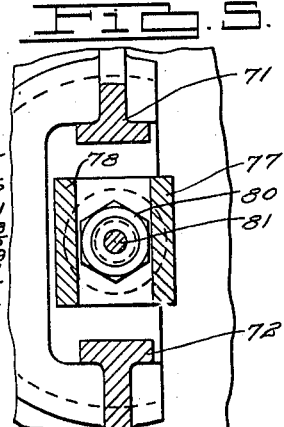
FIG. 7.
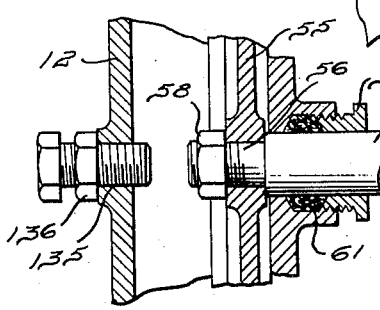
FIG. 9.
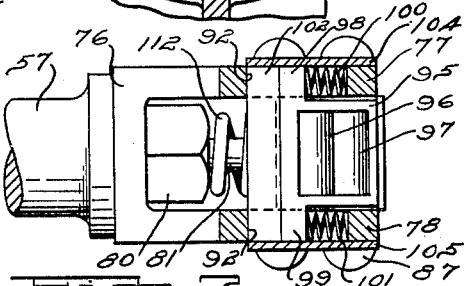
INVENTOR.
Louis C. Huck,
BY
Harness, Dickey, Pierce & Hamm
ATTORNEYS.

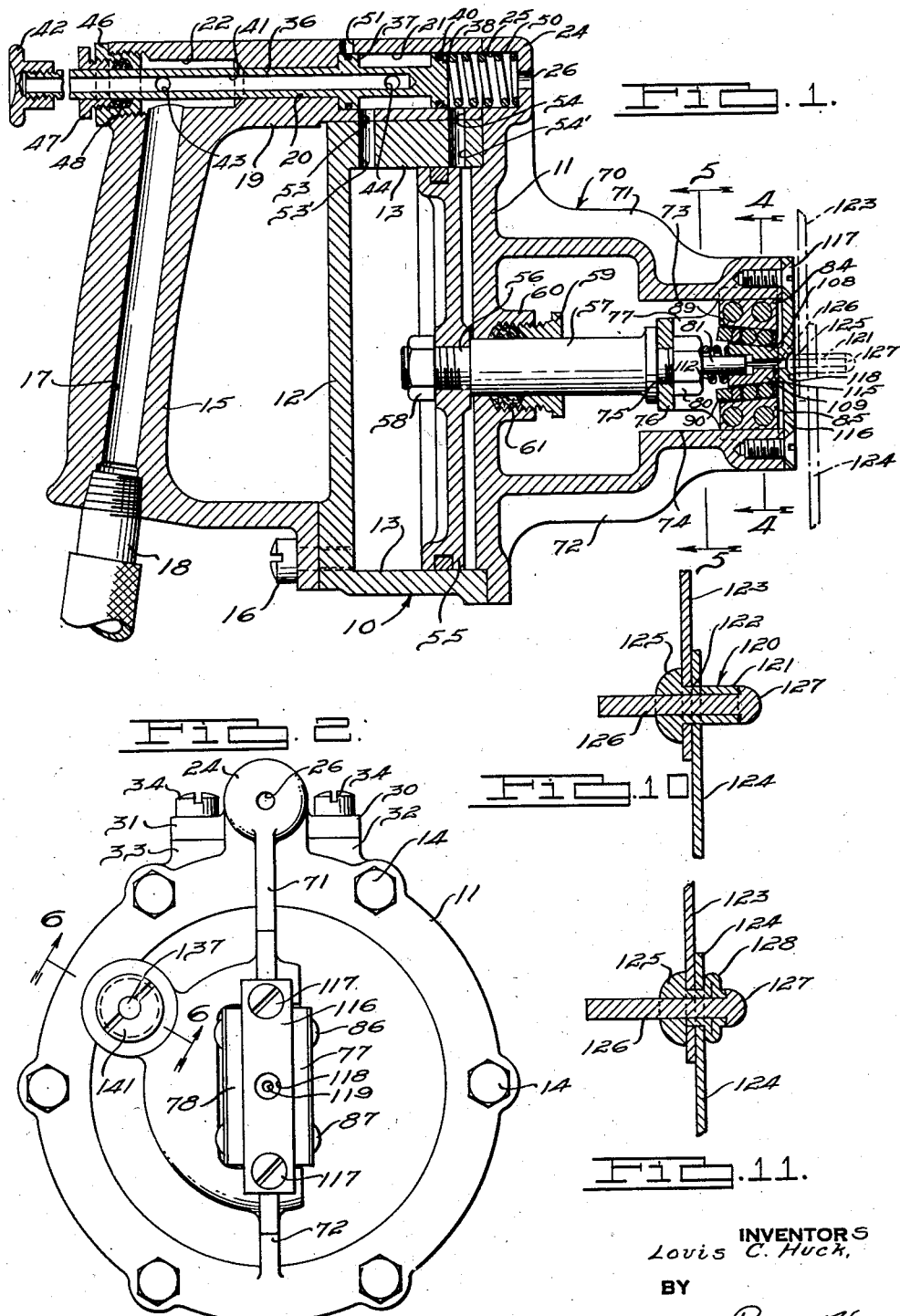

Patented Sept. 8, 1936

2,053,716

UNITED STATES PATENT OFFICE 2,053,716

RIVET SETTING MACHINE

Louis C. Huck, Grosse Pointe Village, Mich., assignor to Huxon Holding Corporation, Detroit, Mich., a corporation of Michigan Application August 31, 1931, Serial No. 560,289
Renewed August 9, 1934

32 Claims. (Cl. 218—19)

The invention relates to rivet setting machines or machines for applying rivets to structural elements for securing them together.

Particularly, the machine is adapted to set rivets of the general type shown and described in the co-pending application for patent of Louis C. Huck, Serial No. 545,004, filed June 17, 1931, relating to rivets. According to one form of the invention in such co-pending application for patent, the rivet comprises a female member having a cylindrical body portion and a rivet head at one end thereof. The female member cooperates with a male member extending longitudinally therethrough, which has a head at one end engaging that end of the female member opposite the rivet head thereon. The rivet as thus assembled is inserted through openings in a pair of structural elements to be connected thereby, until the rivet head on the female member engages the side of the structure adjacent thereto. The male member projects outwardly beyond the rivet head on the female member, and by pulling it through the female member in a direction outwardly from the head of the latter, and applying the reactionary force of such operation to the head on the female member, the inner body portion of the female member is buckled against the opposite side of the structure. During pulling of the male member through the female member in this manner, it is of course necessary to hold the female member stationary.

The principal objects of the present invention are to provide a machine for applying a rivet of this character; and particularly to provide a machine which will hold the rivet head on the female member against the structure being riveted, and at the same time pull the male member through the female member for the purpose of buckling the inner body portion of the latter against the inner side of the structure.

For a better understanding of the invention reference may be had to the accompanying drawings forming a part of the specification, wherein:

Figure 1 is a longitudinal, cross-sectional view of a machine constructed according to one form of the invention;

Fig. 2 is an end view of the machine shown by Fg. 1, taken from the right end thereof;

Fig. 3 is a fragmentary cross-sectional view of the machine shown by Fig. 1, illustrating the manner in which the rivet gripping jaws are moved together;

Fig. 4 is a cross-sectional view on a larger scale, taken substantially along line 4—4 of Fig. 1;

Fig. 5 is a cross-sectional view on a larger scale, taken substantially along line 5—5 of Fig. 1;

Fig. 6 is a cross-sectional view, taken substantially along line 6—6 of Fig. 2;

Fig. 7 is a cross-sectional view on a larger scale, taken substantially along line 7—7 of Fig. 3;

Fig. 8 is a cross-sectional view, taken substantially along line 8—8 of Fig. 4;

Fig. 9 is a fragmentary cross-sectional view of a machine similar to that shown by Fig. 1, illustrating the manner in which movement of the piston in the cylinder may be limited in one direction;

Fig. 10 illustrates a rivet as applied to a structure, prior to setting the rivet by means of the machine;

Fig. 11 illustrates the construction shown by Fig. 10 after the rivet has been set.

Referring to Fig. 1, a cylinder indicated at 10, comprises a circular base plate 11 and a cup-shaped casing 12 having a cylindrical wall 13. Bolts 14 shown by Fig. 2, connect the periphery of the plate 11 to the end of the wall 13 opposite the base of the casing 12. A handle 15 is secured to the outer wall of the casing 12 by means of machine bolts 16 and 34 and such handle is provided with a longitudinally extending aperture 17 which communicates with a conduit 18 in turn connected to a supply of air or other suitable fluid under pressure. At its end opposite the conduit 18, the handle 17 is integral with a tubular plunger valve casing 19, the free end of which extends alongside and in contact with the wall 13 of the cylinder. Intermediate its ends, the bore of the casing 19 is relatively small, as indicated at 20, while inwardly and outwardly of such portion of the bore, the latter is enlarged as indicated at 21 and 22, respectively, such enlarged openings extending respectively to opposite ends of the casing. At its inner end, the casing abuts a cup-shaped portion 24 integral with the base 11 of the cylinder, that has an opening 25 complementary to the opening 21 and a small opening 26 communicating with the atmosphere. The casing 19 is provided with laterally projecting portions 30 and 31 shown by Fig. 2, which are secured respectively to bosses 32 and 33 on the wall 13 of the cylinder, by means of bolts 34.

A plunger 36, having a longitudinal opening 41, snugly and slidably fits in the intermediate part 20 of the bore in the casing 19, and is provided adjacent its inner end with a cylindrical flange 37, which has a sliding fit in the opening 21 in the casing. A second and similar flange 38 is formed at the extreme inner end of the plunger and this flange also is adapted to slide in the opening 21. For the purpose of securing a seal between the outer surfaces of the flanges and the wall of the opening 21, thereby preventing the escape of fluid between such surfaces and the wall, resilient sealing gaskets or rings are provided in annular grooves in the flanges, that resiliently contact with the wall of the opening.

The opening 41 in the plunger, is closed at its outer end by means of a cap 42, while the opening at the other end of the plunger is closed by a solid portion adjacent the flange 38. The side wall of the plunger is provided with a pair of spaced laterally directed openings 43 and 44, respectively, the opening 43 connecting the opening 41 in the plunger to the portion 22 of the bore in the casing 19, while the opening 44 connects the space between the flanges 37 and 38 on the plunger, with the opening 41. Hence, fluid under pressure such as compressed air, can flow through the opening 17 in the handle, through the opening 22 in the casing 19, through the opening 43 in the wall of the plunger, through the longitudinally extending opening 41 in the plunger, through the opening 44 at the other end of the plunger, and into the space between the flanges 37 and 38. The opening 22 is closed at its outer end by means of a threaded collar 46 threaded into the end of the casing 19, and a second collar 47 threaded into the first collar, which engages and compresses a gasket 48 around the plunger.

Normally the plunger will be urged into its outermost position wherein the flange 37 contacts with the shoulder in the casing 19 at the end of the intermediate opening 20, by means of a coiled spring 50 located between the inner end of the plunger and the base of the cup portion 24 of the cylinder base 11. When the plunger is in this position, the flange 37 closes a vent 51 through the wall of the casing 19 communicating with the atmosphere, and the flanges 37 and 38 respectively uncover openings 53 and 54 in the casing wall, that respectively communicate with openings 53' and 54' in the cylinder wall 13.

The cylinder 10 has a piston 55 therein which is secured to a reduced threaded portion 56 of a piston rod 57 extending through the base 11. A nut 58 threaded on the portion 56 of the rod 57, retains the piston on the rod. Fluid is prevented from leaking from the cylinder around the rod 57 by means of a threaded sleeve 59 engaging a boss 60 on the base 11, that compresses a gasket 61 around the rod.

With the plunger in position shown by Fig. 1, fluid under pressure flows from the space between the flanges 37 and 38, into the openings 53 and 53' and into the cylinder at the outer side of the piston, causing the piston to move inwardly as shown. When it is desired to move the piston in the opposite direction, the plunger is moved inwardly until the flange 37 thereon moves past opening 53, and flange 38 moves past opening 54, whereupon the space between the flanges will communicate with the opposite end of the cylinder and fluid under pressure will cause the piston to move outwardly. When the piston moves inwardly to the position shown by Fig. 1 with the plunger in the position shown, air on the inner side of the piston is allowed to exhaust through the openings 54 and 54', and through the opening 26 in the cup casing 24. When the plunger is moved inwardly in the manner previously mentioned, the outer end of the cylinder communicates with the opening 51, since the flange 37 then has moved to such position that both the opening 51 and the opening 53 communicate with each other.

As best shown by Figs. 1, 3, and 4, the base 11 of the cylinder is provided with a yoke 70 comprising arms 71 and 72 which extend along opposite sides of the piston rod 57, and terminate in straight portions 73 and 74. The rod 57 at its free end has a reduced threaded portion 75 which extends through the base of a second yoke 76 having legs 77 and 78 which are disposed at opposite sides of the straight portions 73 and 74 of the yoke 70. The base of yoke 76 is secured to the rod 57 by means of a nut 80. The threaded portion 75 of rod 57 terminates outwardly of the nut 80 in a pin portion 81, the purpose of which will be set forth presently. Blocks 84 and 85 guidingly engaging respectively the adjacent surfaces of the straight portions 73 and 74 of yoke 70, are connected to the legs 77 and 78 of yoke 76 by means of rivets or other suitable securing means, 86 and 87.

As shown by Figs. 1, 3, and 8, the adjacent surfaces of the blocks 84 and 85 indicated at 89 and 90 respectively, are inclined, and converge toward the outer end of the yokes. Each of the legs 77 and 78, as best shown by Fig. 8, has a pair of tapered slot portions 92 and 93, which are parallel to the tapered surfaces 89 and 90 of blocks 84 and 85 respectively, and located slightly inward of such surfaces. The slots 92 in the legs 77 and 78 permit the insertion of a rectangular frame 95 (Fig. 7) between the legs, which has a pair of rollers 96 and 97 therein adapted to have rolling engagement with the tapered surface 89 on block 84. The frame 95 has legs 98 and 99 which slide in the slots 92, and between such legs and the outer end of the slots, helical springs 100 and 101 are disposed which normally tend to urge the frame 95 and hence the rollers therein toward the diverging ends of the surfaces 89 and 90. The frame is maintained in the slots by means of a bar 102 disposed between the legs 98 and 99 and the inner ends of the slots. The same arrangement, of course, is provided in connection with slots 93 in the legs 77 and 78 and hence a pair of rollers 96 and 97 are disposed in contact with each of the surfaces 89 and 90 on blocks 84 and 85. The frames 95 having the rollers 96 and 97, are maintained in proper position by means of plates 104 and 105 secured to opposite sides of the legs 76 and 77 by means of the aforesaid rivets 86 and 87.

Now referring to Fig. 3, a pair of jaw members 108 and 109 are disposed between the pairs of rollers 96 and 97 and such jaws have outer tapered surfaces corresponding to the inclined positions of the rollers. Adjacent the pin 81 on the piston rod 57, the jaws are provided with complementary, semi-cylindrical openings 110 and 111 which receive the pin, this pin serving as a guide for the jaws. It should be understood however that the openings 110 and 111 are sufficiently large to permit proper clamping of the jaws about the male member of the rivet. Between the nut 80 on the rod, and the outer end faces of the jaws, a helical spring 112 encircles the pin 81, and normally urges the jaws toward the outer end of the yokes. Inwardly of the openings 110 and 111, adjacent sides of the jaws have clamping surfaces 113 and 114 respectively, which terminate in a counter-sunk recess 115 adapted to guide a rivet shank member into a position between the jaws. The outer ends of the portions 73 and 74 of yoke 70 are connected by means of a plate 116 secured to such legs by means of screws 117 and such plate at its center is provided with a concave recess 118 and a straight opening 119 extending through the plate at the base of the recess. The opening 119 is aligned with the center line between the jaws 108 and 109.

Referring to Figs. 10 and 11, the rivet to be set by means of the machine described comprises a female member 120 having a body portion 121 inserted through openings 122 in a pair of plates 123 and 124. The female member also includes a convex head 125 engaging the outer surface of plate 123. The female member is longitudinally apertured to receive a male member 126 which has a head 127 on its inner end engaging the end of the body 121 opposite the head 125. The male member extends outwardly beyond the head 125 on the female member, for the purpose of providing a gripping portion by means of which the male member can be pulled outwardly while the female member is retained in position, and hence the inner portion of the body 121 on the female member buckled as indicated at 128 in Fig. 11, against the inner side of plate 124.

The operation of the machine is as follows, assuming that it is desired to set the rivet after it has been applied manually in the manner shown by Fig. 10. The machine is moved into such position that the outer end of the male member 126 projects through the recess 118 and opening 119 in plate 116 until the recess 118 complementarily receives the head 125 on the female member. It, of course, is to be understood that the piston will be in its outermost position, and hence the jaws 108 and 109 positioned as shown in Fig. 3. In this connection also it is desired to call attention to the fact that the inner side of plate 116 is provided with a boss 130 which permits a further inward movement of the piston rod 57 and blocks 84 and 85 after the jaws 108 and 109 have contacted with the boss. After the machine has so been positioned, air is admitted into the cylinder at the outer side of piston 55, by allowing the plunger 42 to move to its outer position, and this causes the blocks 84 and 85 to be moved into a position substantially contacting with the plate 115. The jaws 108 and 109, of course, will move with the blocks 84 and 85, and as they approach the plate 115, the male member 126 of the rivet enters the counter-sunk recess 115 in the ends of the jaws, and is guided into a position between the clamping portions 113 and 114 of the latter. As the jaws move into such relation with the male member, expansion of the jaws will be permitted because the blocks 84 and 85 continue to move inwardly toward the plate 116 while the jaws are halted in their movement as the male member moves between them. The arrangement of parts is such that the jaws 108 and 109 finally abut the boss 130 with the male member disposed between them, and the blocks 84 and 85 will rest against the plate 116. The spring 112 insures proper positioning of the jaws with respect to the male member and causes such jaws to have slight clamping engagement therewith. Then the plunger 42 is moved inwardly permitting fluid under pressure to enter the cylinder at the inner side of the piston 55, which causes an outward movement of such piston and hence the yoke at the outer end of the piston rod. Then the blocks 84 and 85 moving with the yoke will move outwardly, which will cause the rollers 96 and 97 to roll along the outwardly diverging surfaces of the jaws as well as along the blocks, the springs 100 and 101 permitting the latter rolling movement. The jaws then will be urged against the male member 126 of the rivet and into firm clamping engagement therewith, and when the rollers become wedged between the blocks and the jaws, further relative movement of the rollers with respect to the jaws and blocks will not occur, and the jaws will move along with the rollers. The plate 116 will be maintained against the rivet head 125 during these operations, and as the jaws 84 and 85 move outwardly, they pull the male member 126 through the female member and buckle the inner body portion thereof against the inner side of plate 124, the reactionary force of the mechanism preventing movement of the female member with the male member. As soon as the body is buckled, the plunger 42 is released which allows air to enter the cylinder at the outer side of the piston and the jaws will be released from the male member and the mechanism can be removed.

For limiting movement of the piston outwardly in pulling the male member through the female member, a pressure operated valve may be provided as shown by Fig. 6, which comprises a plunger 137 having a valve head 138 normally closing an opening 139 in the base 11 of the cylinder. A spring 140 encircling a portion of the plunger valve 137, and abutting the head 138 at its inner end, and a threaded adjusting sleeve 141 threaded into the base 11, at its other end normally maintains the valve closed. When the valve is open, fluid is allowed to escape from the interior of the cylinder, through the opening 139, past the valve head 138 and to the atmosphere through a side opening 142. It is apparent that by adjusting the sleeve 141, the tension of the spring 140 may be varied and hence the maximum pressure of fluid in the cylinder regulated as desired. It will be noted that the plunger 137 has sliding engagement with the threaded element 141 and hence will move to and from its closed position in a predetermined manner. In setting the rivet, as the female member buckles against the inner plate, further movement of the male member is more strongly resisted and a greater pressure in the cylinder would be required. The valve prevents the building up of this pressure beyond the maximum set for the valve and in this way prevents movement of the piston after the rivet is set in the desired manner.

Also, or as an alternative manner of limiting outward movement of the piston 55 during the riveting operation, a set screw 135 may be utilized as shown by Fig. 9, which is threaded through the casing 12 of the cylinder, in alignment with the piston rod 57. A lock nut 136 is used for maintaining the set screw in any adjusted position. As the piston moves outwardly, it will engage the inner end of the piston 135 and this engagement can be so timed that the female member will be collapsed against the inner side of the plate 124, simultaneously with engagement of the outer end of the piston rod with the set screw.

From the foregoing description and drawings it is apparent that a machine has been provided which will readily apply or set rivets of the character set forth and that such rivets may be applied by a single person without difficulty. Moreover, it is apparent that the machine is so constructed that positive clamping engagement can be secured between the male member of the rivet and the clamping jaws while at the same time the female member is maintained stationary. In conjunction with the type of rivets utilized, it is apparent that a mechanism of the aforesaid character enables riveting structures from one side thereof which is considerably advantageous, particularly in riveting structures wherein one side of the structure is more or less inaccessible.

Although only certain forms of the invention have been described and illustrated in detail, it will be apparent to those skilled in the art that various modifications may be made without departing from the scope of the appended claims.

I claim:

1. A mechanism for applying rivets to a structure, which comprises a reciprocatory member, means for reciprocating the member, said member having adjacent opposed parts at one end which converge in one direction, a pair of separately free clamping jaws between said parts and having opposed surfaces converging similarly to said parts and means normally urging said jaws along said parts toward the converging ends thereof.

2. A mechanism for applying rivets to a structure, comprising a reciprocatory member, means for reciprocating the member, said member having adjacent opposed walls at one end which converge in one direction, a pair of clamping jaws between said walls and having surfaces converging similarly to the walls, and rolling means between said walls and surfaces.

3. A mechanism for applying rivets to a structure, comprising a reciprocatory member, means for reciprocating the member, said member having adjacent opposed walls at one end which converge in one direction, a pair of clamping jaws between said walls and having surfaces converging similarly to the walls, rolling means between said walls and surfaces, and means normally urging the jaws toward the converging end of the walls.

4. A mechanism for applying rivets to structures, which comprises a reciprocatory member having oppositely disposed surfaces at one end, that converge in one direction, a pair of clamping jaws between said surfaces, and rolling means between the jaws and the surfaces.

5. A jaw mechanism comprising a pair of jaw members having opposed surfaces converging in one direction, a movable member having surfaces respectively adjacent to and converging similarly to the jaw surfaces, and rolling means between each pair of surfaces.

6. A jaw mechanism comprising a pair of jaw members having opposed surfaces converging in one direction, a movable member having surfaces respectively adjacent to and converging similarly to the jaw surfaces, and rolling means between each pair of surfaces, said rolling means being resiliently mounted on one of the members.

7. A jaw mechanism comprising a pair of jaw members having opposed surfaces converging in one direction, a movable member having surfaces respectively adjacent to and converging similarly to the jaw surfaces, rolling means between each pair of surfaces, and means normally urging the jaw members in one direction.

8. A mechanism for applying to a structure, a rivet including a female member and a male member extending through the female member for upsetting the female member at one side of the structure, which comprises means for holding the female member in position, means for simultaneously moving the male member through the female member to upset the latter against the side of the structure, and means for limiting the movement of the last mentioned means.

9. A machine for setting a rivet of a type wherein a shank projects through and beyond one end of a tubular member and engages the other end of the member, comprising a member for abutting the end of the tubular member to hold it in place in openings in a structure to be riveted, jaws movable on said abutment member and having inner gripping surfaces for engaging a substantial linear portion of the projecting end of the shank, means including tapered surfaces for moving the jaws to first cause clamping thereof about the shank, and then to cause the jaws and shank to be moved relative to the tubular member, and means for maintaining said gripping surfaces substantially parallel to the shank so that during clamping engagement of the jaws, the gripping surfaces have full length contact with the shank.

10. A machine for setting a rivet of a type comprising a tubular member and a shank projecting through and beyond one end of the tubular member and engaging the other end of such member, comprising a housing, fluid pressure responsive means in the housing, a member connected to said means and projecting beyond the housing, a member secured to the housing for abutting one end of the tubular member and holding it in place in openings in a structure to be riveted, a jaw device movable on said member secured to the housing for gripping and pulling the projecting portion of the shank, means connecting the member projecting beyond the housing to the jaw device, a handle on the housing, and trigger means adjacent thereto for enabling an operator to readily manipulate the machine and control a supply of fluid under pressure to the housing.

11. A machine for setting rivets of a type in which a tubular member is employed and a shank projects through and beyond one end of the tubular member and has a portion engaging the other end of the tubular member, comprising a cylinder, a handle connected to the cylinder, a piston in the cylinder, a piston rod connected to the piston and extending beyond one end of the cylinder, a member on the cylinder and projecting therefrom for engaging one end of the tubular member and holding it in place, and a jaw device movably mounted on said member and connected to the piston rod, said jaw device being adapted to grip the shank and pull it upon application of fluid pressure to one side of the piston.

12. A machine for setting rivets of the type where a tubular member is employed and a shank projects through and beyond one end of the tubular member and engages the other end of the latter, comprising a cylinder, a piston in the cylinder, a piston rod projecting from one end of the cylinder, a member connected to the cylinder and projecting from one end thereof in the general direction of the piston rod, means on said member for engaging the tubular rivet member and holding it in place in openings in a structure to be riveted, a jaw device slidable on said member and adapted to grip the projecting portion of the shank, means connecting the piston rod to the jaw device, and means for controlling a supply of fluid under pressure to the cylinder.

13. A machine for setting rivets of the type where a tubular member is employed and a shank projects through and beyond one end of the tubular member and engages the other end of the latter, comprising a cylinder, a piston in the cylinder, a piston rod projecting from one end of the cylinder, a member connected to the cylinder and projecting from one end thereof in the general direction of the piston rod, means on said member for engaging the tubular rivet member and holding it in place in openings in a structure to be riveted, a jaw device slidable on said member and adapted to grip the projecting portion of the shank, means connecting the piston rod to the jaw device, a handle on the cylinder, and means for controlling a supply of fluid under pressure to the cylinder including a control element positioned near the handle for manual manipulation by an operator.

14. A machine for setting rivets comprising a housing, fluid pressure responsive means in the housing, a jaw device operatively connected to the pressure responsive means, a member connected to the housing and serving as a guide for the jaw device, said jaw device being adapted to grip and pull the rivet member while the reactionary force of the pull is applied by the guide member, and release means for automatically limiting the building up of fluid pressure in the cylinder.

15. A mechanism for applying to a structure, a rivet comprising a female member and a male member projecting therethrough for upsetting the female member at one side of the structure, which comprises means for holding the female member in position, means for simultaneously moving the male member through the female member to upset the latter against the side of the structure, and automatic means for substantially preventing any further movement of the male member in the female member, after the female member has been upset to form a head.

16. A mechanism for applying to a structure, a rivet comprising a female member and a male member extending therethrough for upsetting the female member at one side of the structure, which comprises means for holding the female member in position, means for simultaneously moving the male member through the female member to upset the latter against the side of the structure, and means for preventing the moving means from imparting a substantially greater force after the rivet is set.

17. A mechanism for applying rivets to a structure which comprises a reciprocatory member having spaced parts at one end which converge in one direction, means for reciprocating the member, a plurality of separately free clamping jaws between said parts and having surfaces converging similarly to said parts, and means normally urging said jaws along said parts toward the converging ends thereof.

18. A mechanism for applying rivets to a structure which comprises a reciprocatory member, means for reciprocating the member, a plurality of separately free jaws for gripping a rivet element to be pulled, means on the member and jaws for causing the latter to grip and then move the element, and resilient means between the jaws and a part of the member for cushioning movement of the jaws relative to the member in the direction of such movement.

19. An apparatus for setting rivets wherein one element is to be pulled and the reactionary force is applied against another element, which comprises movable power operated means for pulling the first element, means for applying the reactionary force to the other element, and control means governed by resistance to movement of said first element for automatically governing operation of the power operated means.

20. An apparatus for setting rivets wherein one element is pulled and the reactionary force is applied against another element, which comprises movable power operated means for pulling the first element, means for applying the reactionary force to the other element, and control means governed by resistance to movement of said first element for automatically limiting the application of the power to said power actuated means.

21. A mechanism for setting rivets or the like wherein one element is pulled and the reactionary force is applied to another element, which comprises fluid pressure responsive means for gripping and pulling the first element, and means for automatically limiting the building up of fluid pressure in said responsive means.

22. A mechanism for setting rivets or the like wherein one element is pulled and the reactionary force is applied to another element, which comprises fluid pressure operated means for gripping and pulling the first element, and means for automatically governing the operation of said fluid pressure operated means depending upon the resistance to movement of said first element.

23. A mechanism for setting rivets or the like wherein one element is pulled and the reactionary force is applied to another element, which comprises a cylinder, a reciprocatory piston in the cylinder, means operatively connected to the piston for gripping and pulling the first element, and means for automatically limiting the building up of fluid pressure in said cylinder.

24. A mechanism for setting rivets or the like wherein one element is pulled and the reactionary force is applied to another element, which comprises a cylinder, a piston in the cylinder, means operatively connected to the piston for gripping and pulling the first element, and means for automatically limiting the fluid pressure within the cylinder when the tension on the element reaches a predetermined amount.

25. A mechanism for setting rivets or the like wherein the rivet comprises a tubular member and pin projecting therethrough and wherein the head is adapted to be formed at one end of the tubular member and at one side of the structure to be riveted when the pin is pulled from the opposite side of the structure and reactionary force is applied to the adjacent end of the tubular member, which comprises fluid pressure responsive means for gripping and pulling the pin, means for applying the reactionary force to the end of the tubular element, and means for automatically releasing fluid pressure acting against the fluid pressure responsive means after the head has been formed on the tubular member and the tension on the pin has reached a predetermined amount.

26. A mechanism for setting rivets or the like wherein the rivet comprises a tubular member and pin projecting therethrough and wherein the head is adapted to be formed at one end of the tubular member and at one side of the structure to be riveted when the pin is pulled from the opposite side of the structure and reactionary force is applied to the adjacent end of the tubular member, which comprises fluid pressure responsive means for gripping and pulling the pin, means for applying the reactionary force in the end of the tubular element, and means operable automatically after such head is formed for controlling operation of the fluid pressure responsive means.

27. An apparatus for setting rivets wherein the rivet comprises a tubular element and a pin projecting therethrough and wherein the pin is adapted to be pulled to form a head at one end of the tubular element while the reactionary force is applied to the opposite end of the tubular element, which comprises movable power operated means for pulling the pin, means for applying the reactionary force to the end of the tubular element and means operable automatically after the head is formed for controlling operation of the power operated means.

28. A mechanism for setting rivets or the like wherein one element is pulled, comprising power actuated means for gripping and pulling the element, an automatically operable means for governing operation of the power means depending upon the pull on the element.

29. A mechanism for applying to a structure, a rivet including a female member and a male member extending through the female member for setting the female member at one side of the structure, which comprises means for holding the female member in position, means for simultaneously moving the male member through the female member to upset the latter against the side of the structure, and means depending upon movement of the male member for automatically governing operation of the means for moving said male member.

30. An apparatus for setting rivets wherein one element is pulled and the reactionary force is applied against another element, which comprises power operated means for pulling the first element and simultaneously applying the reactionary force to the second element, and control means governed by resistance to movement of said first element for automatically governing operation of the power operated means.

31. An apparatus for setting rivets wherein one element is pulled and the reactionary force is applied against another element, which comprises fluid pressure operated means for pulling the first element and simultaneously applying the reactionary force to the second element, and control means governed by resistance to movement of said first element for automatically governing operation of the fluid pressure operated means.

32. An apparatus for setting a multiple part rivet wherein one rivet part is pulled and the reactionary force is applied to another rivet part, which comprises means having spaced parts which converge in one direction, a plurality of separately free clamping jaws between said spaced parts and having surfaces converging similarly thereto, means for moving the first means so as to cause contraction of the jaws for gripping and pulling the first rivet part, and means for applying the reactionary force to the second rivet part.

LOUIS C. HUCK.